(12) United States Patent
Chan et al.

(10) Patent No.: US 9,488,110 B2
(45) Date of Patent: Nov. 8, 2016

(54) DEVICE AND METHOD FOR PREVENTING LEAKAGE OF AIR BETWEEN MULTIPLE TURBINE COMPONENTS

(71) Applicant: General Electric Company, Schenectady, NY (US)

(72) Inventors: George Joe-Kueng Chan, Salem, MA (US); Victor Hugo Silva Correia, Milton Mills, NH (US); David Hannwacker, Boston, MA (US); Robert Proctor, West Chester, OH (US)

(73) Assignee: General Electric Company, Schenectady, NY (US)

(*) Notice: Subject to any disclaimer, the term of this patent is extended or adjusted under 35 U.S.C. 154(b) by 740 days.

(21) Appl. No.: 13/790,965

(22) Filed: Mar. 8, 2013

(65) Prior Publication Data
US 2014/0250893 A1   Sep. 11, 2014

(51) Int. Cl.
*F01D 11/00* (2006.01)
*F02C 7/28* (2006.01)
*F01D 25/14* (2006.01)

(52) U.S. Cl.
CPC ............ *F02C 7/28* (2013.01); *F01D 11/005* (2013.01); *F01D 25/145* (2013.01); *F05D 2260/941* (2013.01); *Y02T 50/672* (2013.01); *Y02T 50/675* (2013.01); *Y10T 403/217* (2015.01)

(58) Field of Classification Search
CPC ............ F02C 7/20; F02C 7/28; F01D 9/023
USPC .................................................. 60/805, 806
See application file for complete search history.

(56) References Cited

U.S. PATENT DOCUMENTS

| | | | |
|---|---|---|---|
| 5,141,393 A | 8/1992 | Marra | |
| 5,400,586 A | 3/1995 | Bagepalli et al. | |
| 6,065,756 A | 5/2000 | Eignor et al. | |
| 6,418,727 B1 * | 7/2002 | Rice | F01D 9/023 60/799 |
| 6,758,653 B2 | 7/2004 | Morrison | |
| 6,808,363 B2 | 10/2004 | Darkins, Jr. et al. | |
| 6,895,757 B2 | 5/2005 | Mitchell et al. | |
| 7,237,388 B2 | 7/2007 | Aumont et al. | |
| 7,600,970 B2 | 10/2009 | Bhate et al. | |
| 7,802,799 B1 | 9/2010 | Semmes | |
| 2011/0020118 A1 | 1/2011 | Smoke et al. | |
| 2012/0017594 A1 * | 1/2012 | Kowalski | F01D 9/023 60/722 |
| 2013/0042631 A1 * | 2/2013 | Jadhav | F16J 15/061 60/800 |

OTHER PUBLICATIONS

Unofficial English translation of Chinese Office Action issued in connection with corresponding CN Application No. 201410007914.0 on May 19, 2016.

* cited by examiner

*Primary Examiner* — Patrick Hamo
(74) *Attorney, Agent, or Firm* — General Electric Company; Brian P. Overbeck

(57) ABSTRACT

A turbine comprising a first turbine component being of a first material having a first coefficient of thermal expansion. A second turbine component being of a second material having a second coefficient of thermal expansion, said second turbine component adjacent said first turbine component. A space between said first and second turbine components. A seal assembly sealing said space, wherein at least a portion of said seal assembly has a coefficient of thermal expansion substantially similar to at least one of said first or second turbine components to thereby maintain a seal in said space during thermal expansion or contraction of said first and second turbine components.

13 Claims, 8 Drawing Sheets

DEVICE AND METHOD FOR PREVENTING LEAKAGE OF AIR BETWEEN MULTIPLE TURBINE COMPONENTS

STATEMENT REGARDING FEDERALLY SPONSORED RESEARCH OR DEVELOPMENT

This invention was made with Government support under Contract No. W911W6-11-2-0009 awarded by the United States Army. The Government has certain rights in this invention.

TECHNICAL FIELD

The application relates to turbines, and more specifically, preventing leakage of air in a turbine between multiple turbine components.

BACKGROUND

The aircraft and aircraft engine industry consistently seeks to make improvements to increase fuel efficiency, or reduce specific fuel consumption (SFC) of its technology. Like the automobile industry, much of the efforts to reduce SFC in the aircraft and aircraft engine industry have focused on increasing the overall efficiency of the engine itself. In striving towards that goal, much of the attention is also directed towards reducing the overall weight of the engine. Due to advances in materials design, much attention has been focused on replacing heavier, metal parts with lighter materials, such as ceramic and composite materials, that can withstand the heat and forces that occur in an aircraft turbine engine. While replacing certain parts of the engine with a lighter material reduces the weight of the engine, certain issues arise when the materials are exposed to the high temperature environment within the aircraft engine. One of the issues is the disparity of relative thermal expansions between metal parts and parts made of, for example, ceramic or composite materials. When a metal part is adjacent to a part comprised of a ceramic or composite material, the metal and ceramic or composite parts will expand a different amount and at a different rate, thereby potentially creating unwanted space therebetween. Depending on the location within the engine of the unwanted space or opening, the space or opening may lead to air leaks or other airflow issues therein. Leaks and other airflow issues may reduce the efficiency and therefore increase the SFC of the engine. Due to the disadvantageous nature of leakage flows and the relative motion a thin, compliant seal such as a convoluted, or "W" seal is generally utilized. However in a system where the "W" seal is centered between a metal and ceramic or composite components the relative thermal expansions will cause the thin seal to roll, thereby causing high stresses on the seal and reducing the seal effectiveness and life. Therefore, there is a need in the art for a device and method to counteract the disadvantageous behavior of materials used in turbines which have disparate coefficients of thermal expansion.

SUMMARY

It is therefore desirable to provide a device and method to prevent leakage of air within a turbine. A turbine is provided and comprises a first turbine component being of a first material having a first coefficient of thermal expansion and a second turbine component being of a second material having a second coefficient of thermal expansion, the second turbine component adjacent the first turbine component. A space is between the first and second turbine components. The turbine further comprises a seal assembly sealing the space. At least a portion of the seal assembly has a coefficient of thermal expansion substantially similar to at least one of the first or second turbine components to thereby maintain a seal in the space during thermal expansion or contraction of the first and second turbine components.

A method of preventing leakage in a turbine is also provided and comprises situating a seal assembly in a space between first and second turbine components, thereby sealing the space. The first and second turbine components are of first and second materials having first and second coefficients of thermal expansion, respectively. A portion of said seal assembly has a coefficient of thermal expansion substantially similar to at least one of said first or second turbine components. The method further comprises maintaining a seal in the space during thermal expansion or contraction of said first and second turbine components.

A seal assembly configured to seal a space between first and second objects is provided and comprises a seal member having first and second ends, the second end spaced from the first end along an axis. The assembly further comprises a seal carrier enveloping at least a portion of the seal member. The seal carrier is adapted to prevent relative movement between the first and second ends in a direction transverse to the axis.

BRIEF DESCRIPTION

Figure 5:
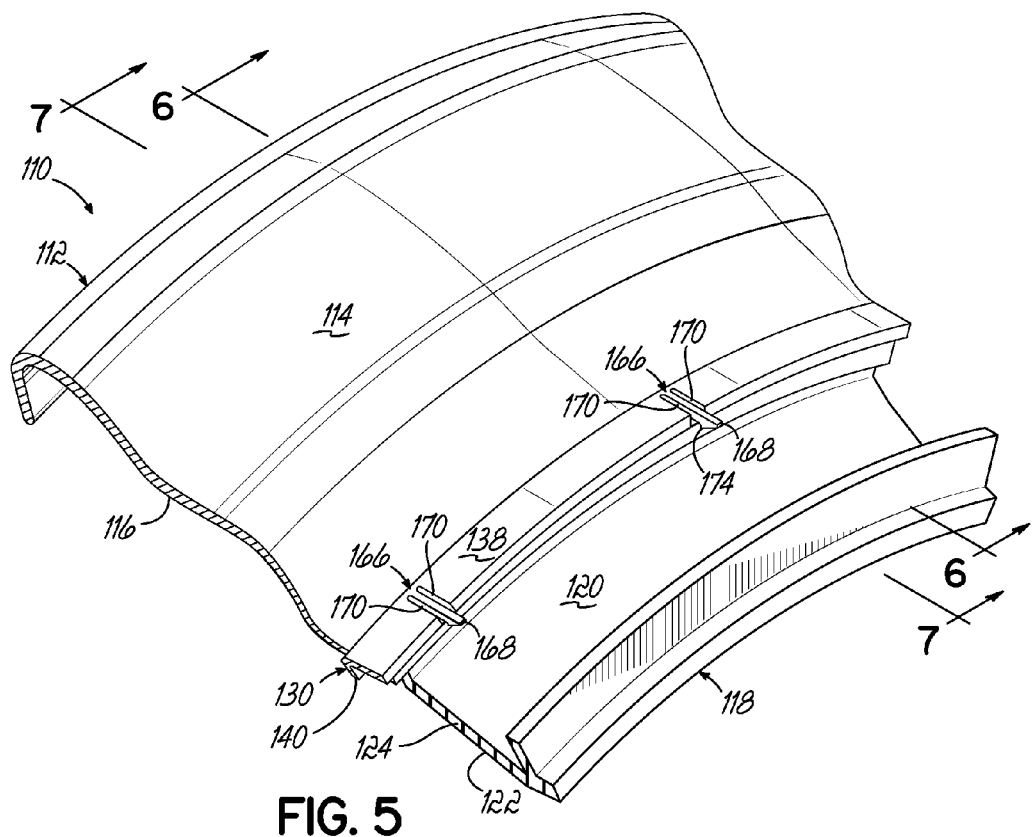
FIGS. 5 and 8 show perspective views of alternative embodiments of a turbine.
Figure 6:
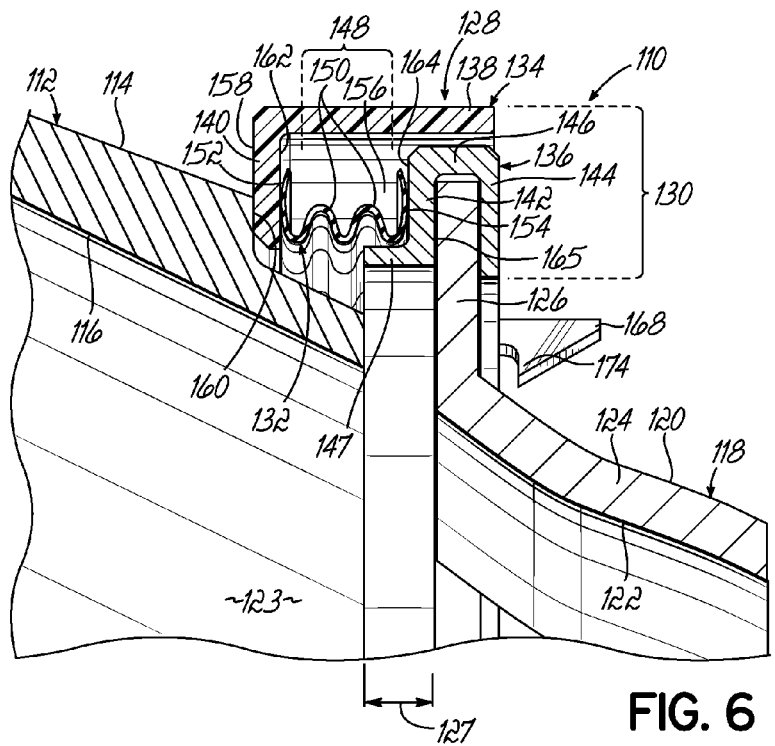
Figure 8:
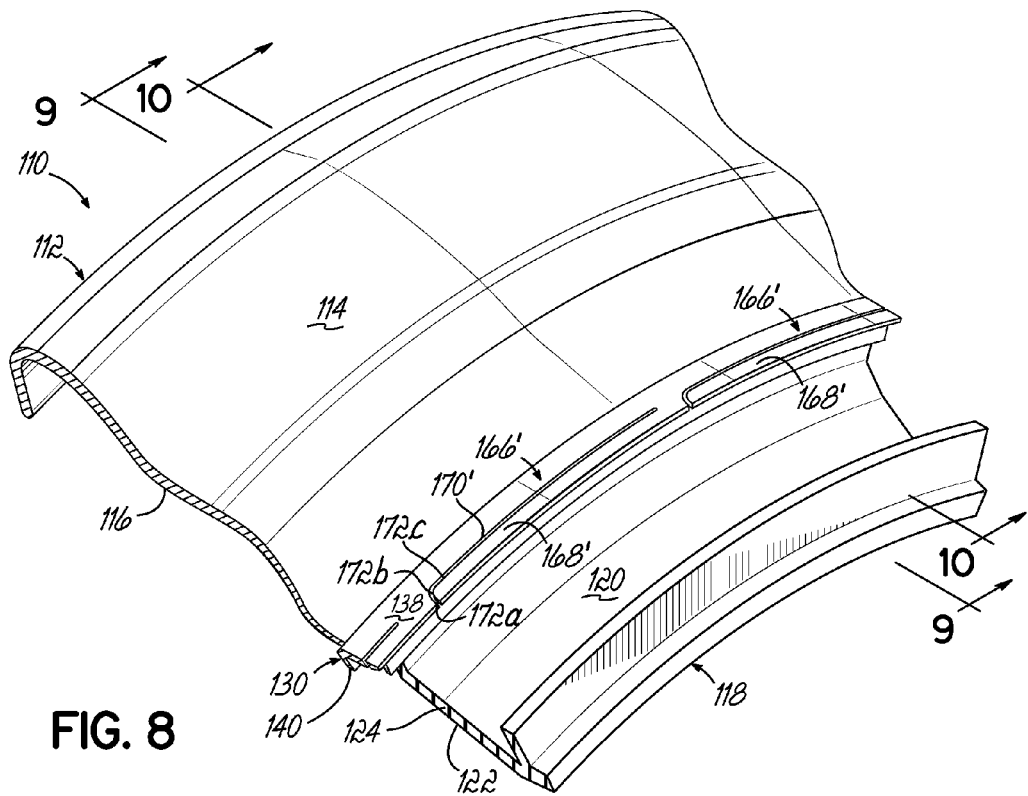
Figure 9:
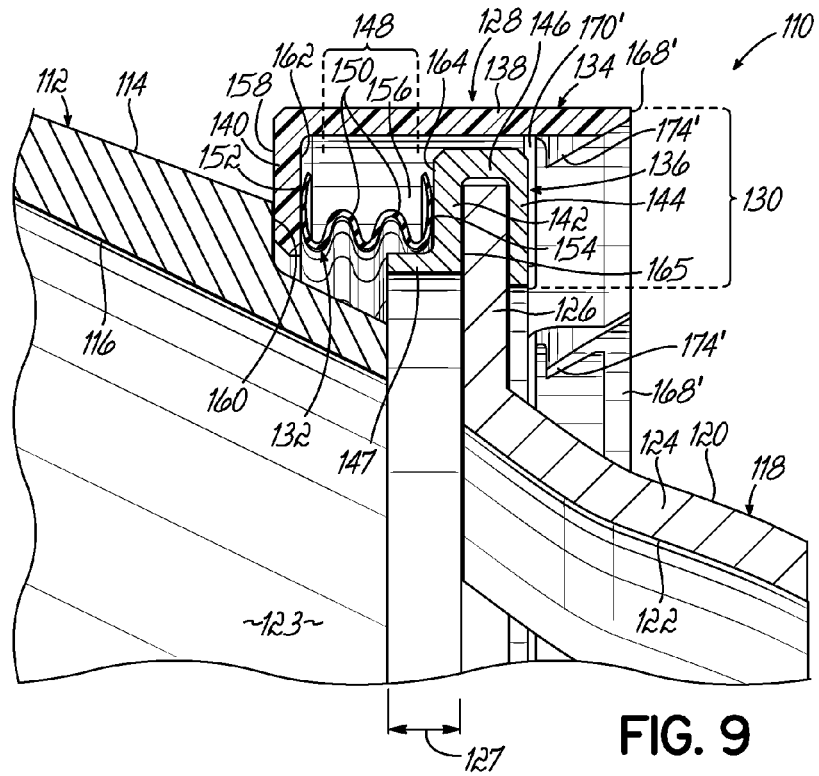

FIGS. 6 and 9 show side cross-sectional views of alternative embodiments of the turbine of FIGS. 5 and 8, along lines 6-6 and 9-9, respectively.

Figure 7:
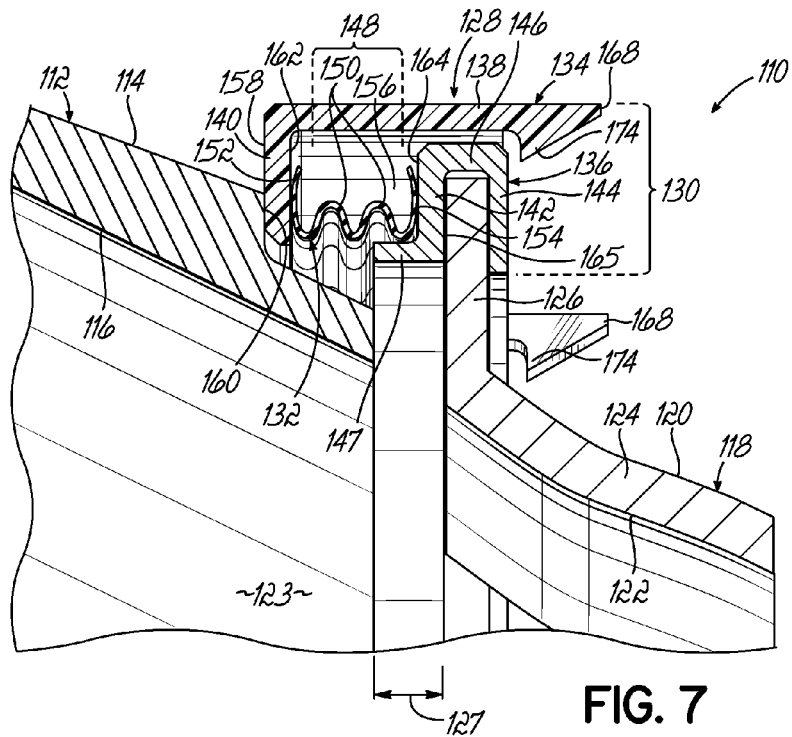
Figure 10:
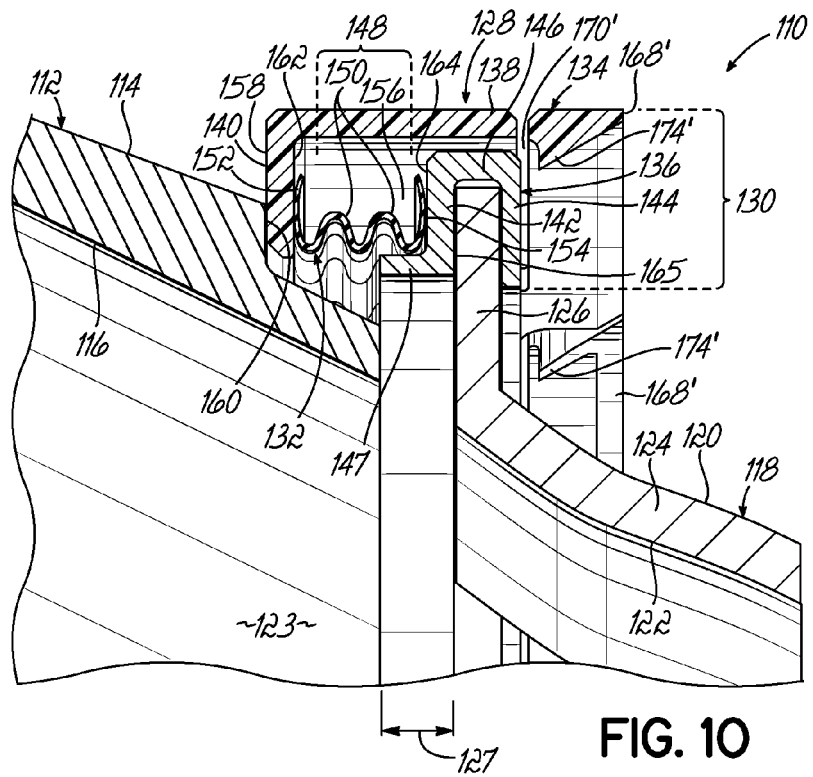

FIGS. 7 and 10 show side cross-sectional views of alternative embodiments of the turbine of FIGS. 5 and 8, along lines 7-7 and 10-10, respectively.

Figure 1:
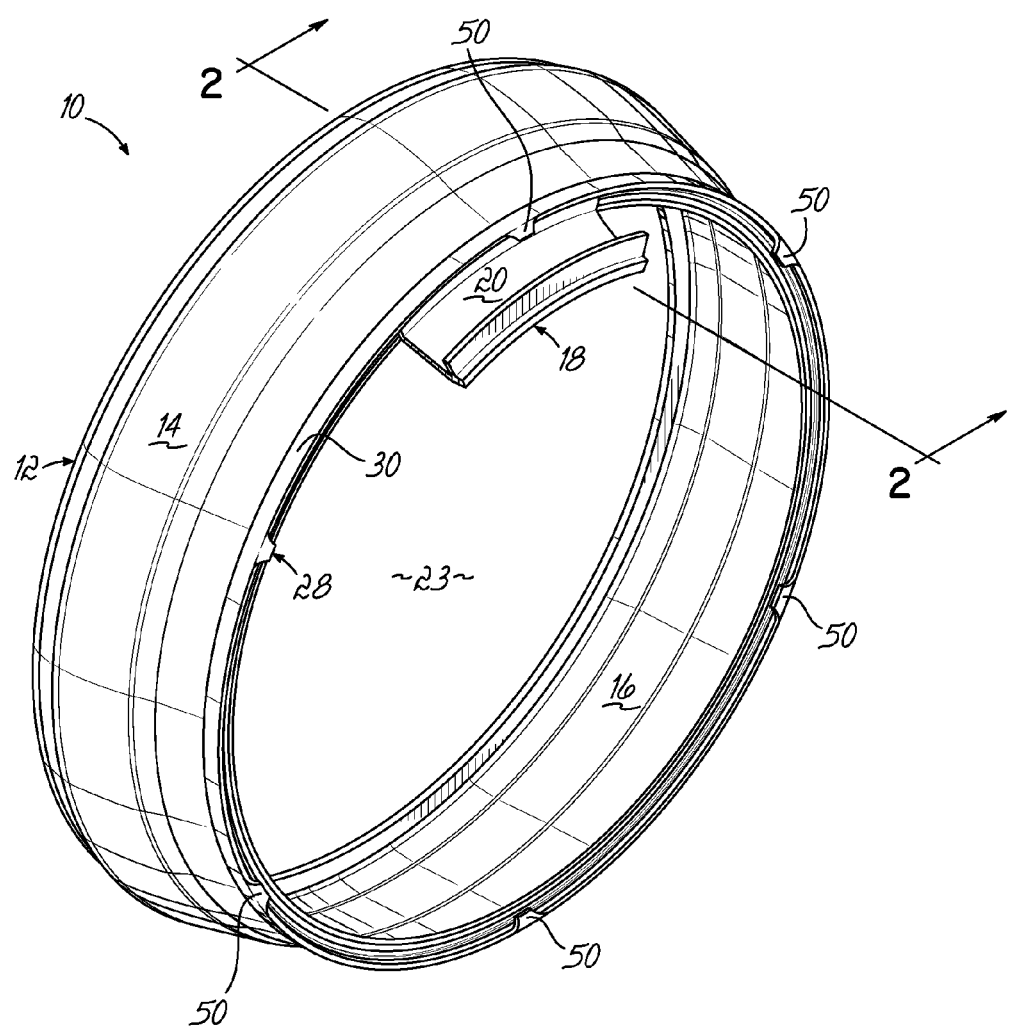
FIG. 1 shows a perspective view of one embodiment of a turbine.
Figure 11:
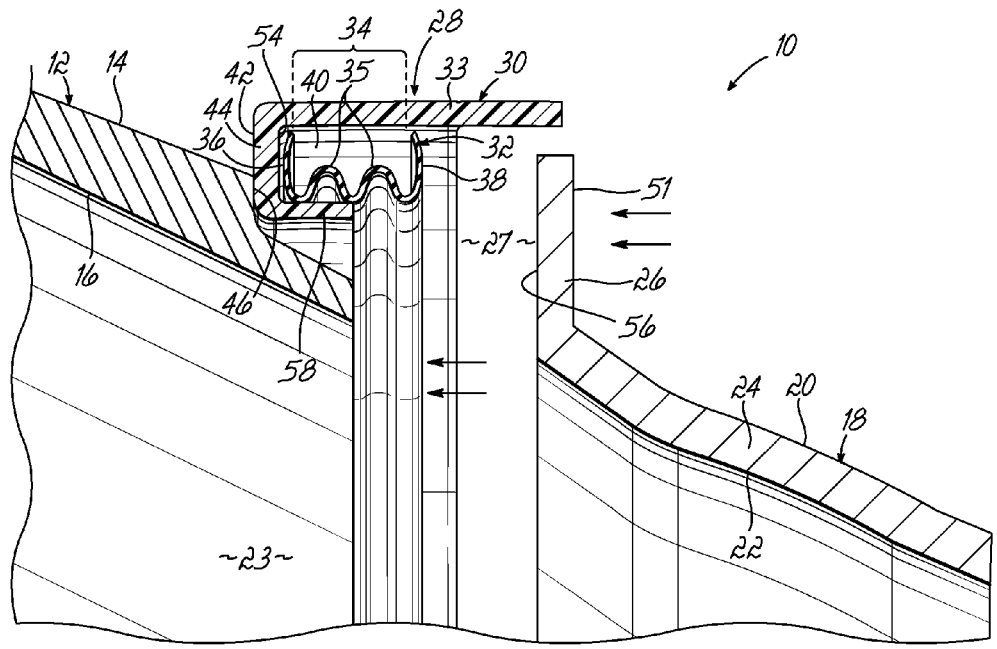
Figure 12:
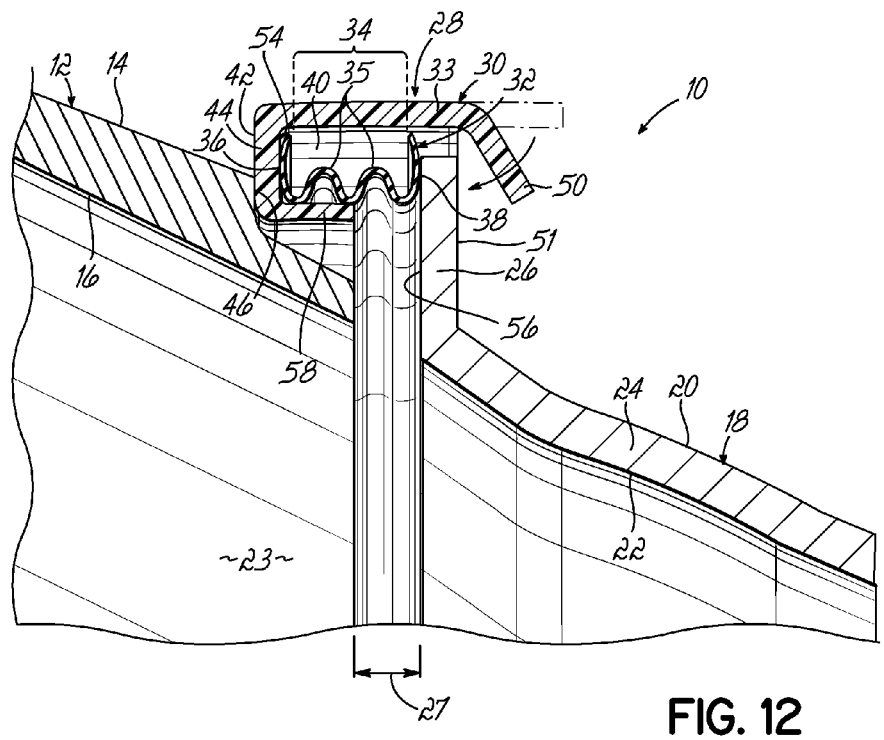

FIGS. 11 and 12 show side cross-sectional views of steps of the assembly method of the embodiment of FIG. 1.

Figure 13:
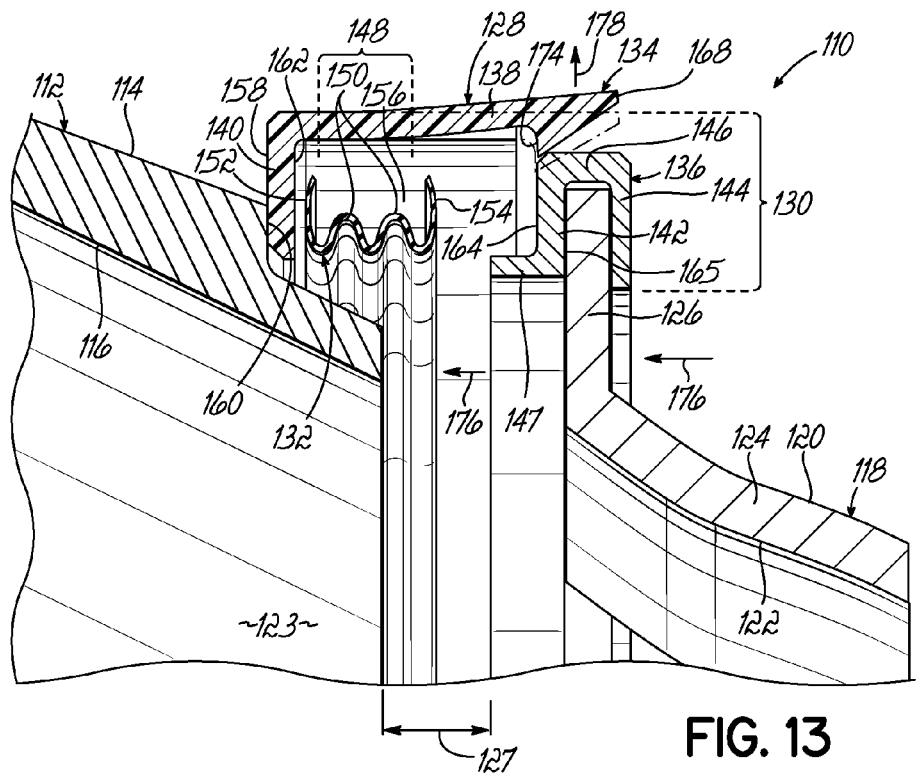
Figure 14:
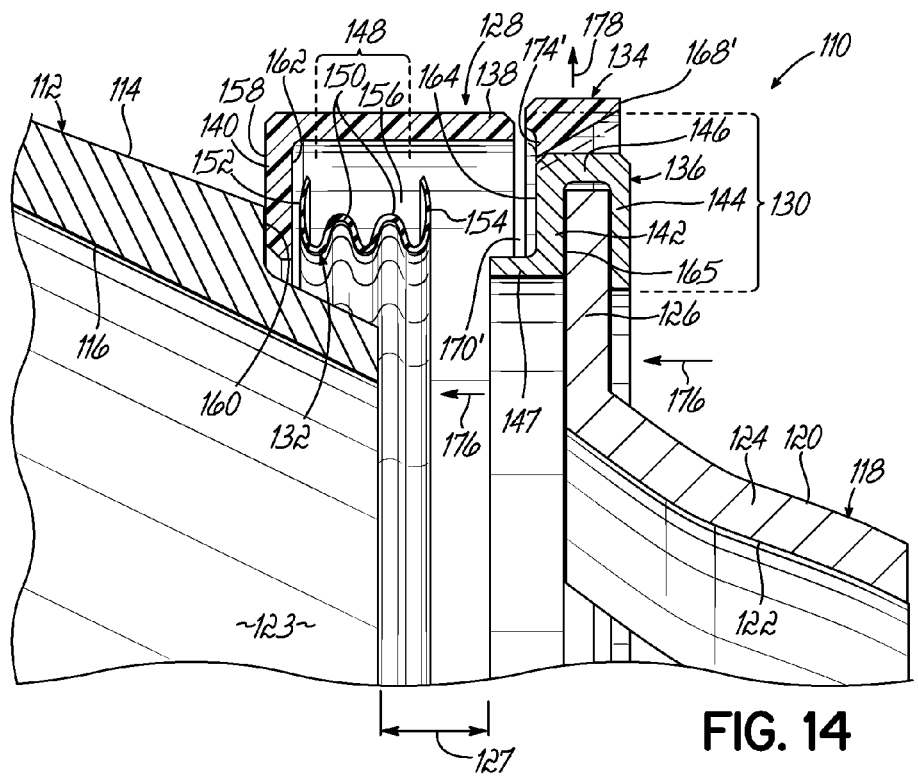

FIGS. 13 and 14 show side cross-sectional views of steps of the assembly method of the embodiments shown in FIGS. 5 and 8, respectively.

DETAILED DESCRIPTION

Figure 2:
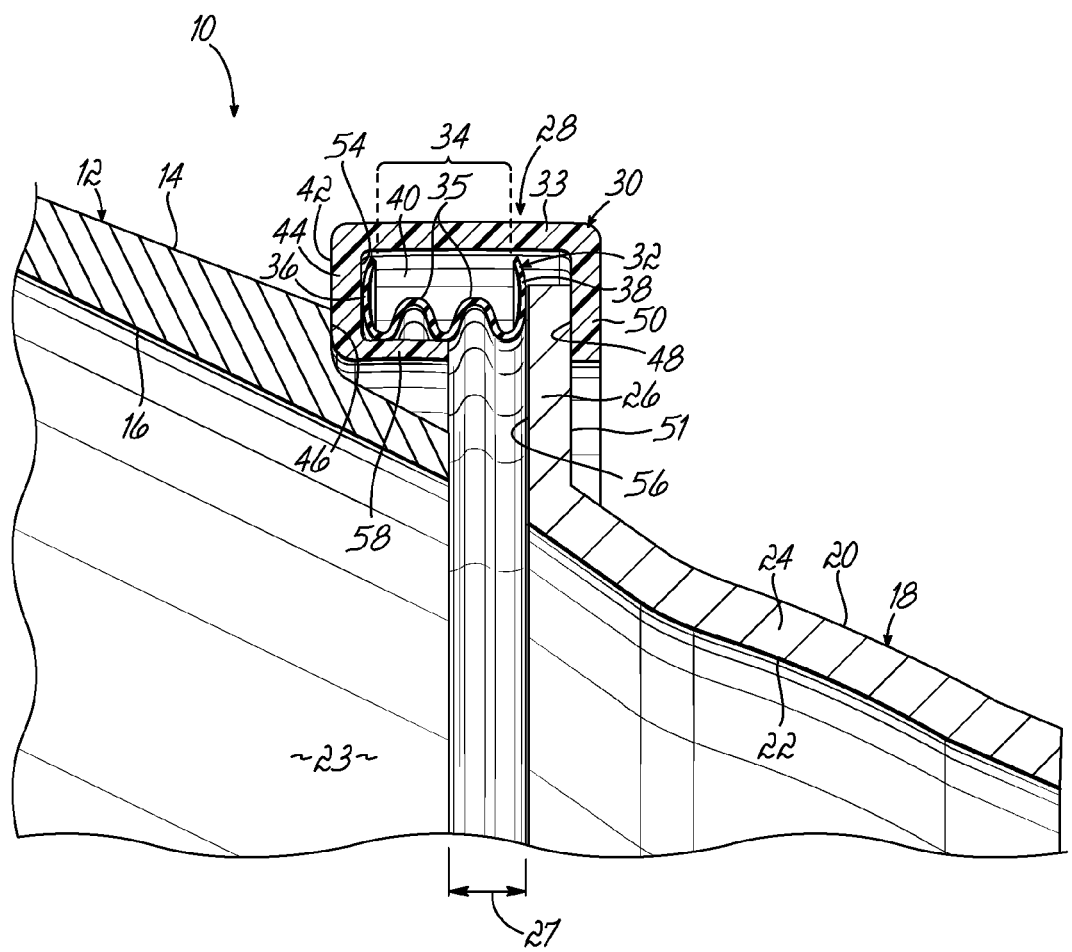
FIG. 2 shows a side cross-sectional view of the turbine of FIG. 1 along lines 2-2.
Figure 4:
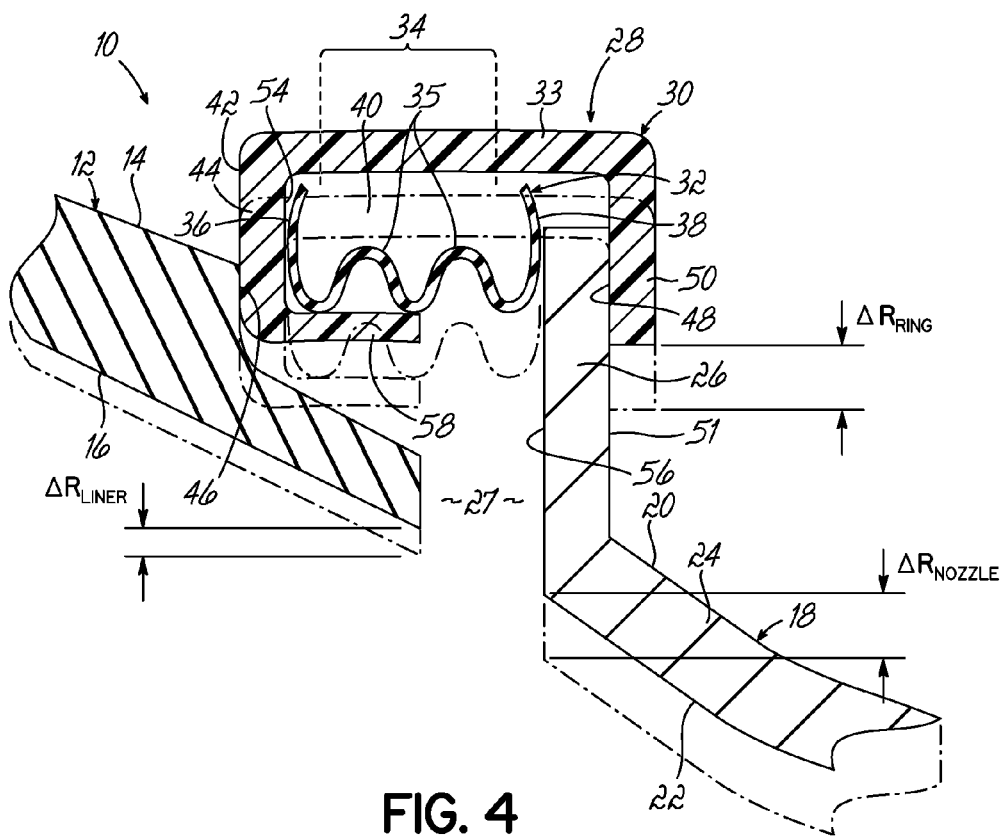
FIG. 4 shows a side cross-sectional view the turbine of FIG. 2 as it experiences a change in ambient temperature.

FIGS. 1, 2 and 4 show one embodiment of a portion of a turbine 10. The turbine includes a combustor (not shown) having a liner. The liner 12 is situated at an angle relative to a center axis (not shown) of the turbine 10. The liner 12 includes an outer radial side 14 and an inner radial side 16. The inner radial side 16 communicates with the channel 23 through which the combusted gases may flow to the nozzle 18. The turbine 10 includes a first stage nozzle 18 aft of the liner 12. The nozzle 18 includes an outer radial side 20 and an inner radial side 22. The nozzle 18 comprises a first portion 24 situated at an angle relative to the center axis of the channel 23 and a second portion 26 extending radially outward from the first portion 24 of the nozzle 18. There is a space 27 (FIG. 4) between the liner 12 and the nozzle 18.

The turbine 10 further includes a seal assembly 28. The seal assembly 28 includes a carrier 30 and a seal member 32. The carrier 30 includes a generally flat, axial flange 33 and first and second flanges 44, 50 extending radially inward from the radially outward portion 33. The seal member 32 as shown in FIG. 2 includes a convoluted portion 34 including multiple folds or convolutions 35 such that it is a generally "W" shaped member. However, there may be more convolutions 35 than shown in FIG. 2. The seal member 32 includes first and second ends 36, 38. The first end 36 is forward of the convoluted portion 34 and the second end 38 is aft of the convoluted portion 34. A generally open portion 40 is disposed generally radially away from the convoluted portion 34 and between the first and second ends 36, 38.

The seal carrier 30 is preferably situated at the space 27 such that a forward face 42 of the first flange 44 of the carrier 30 is engaged with a contact portion 46 of the liner 12. The forward face 48 of the second flange 50 may be engaged with the aft face 51 of the second portion 26 of the nozzle 18. However, the aft face 51 of the second portion 26 and forward face 48 of second flange 50 need not be engaged, as the forward face 48 of the second flange 50 may create an axial restraint with aft face 51 of the second portion 26. The axial restraint created therebetween may ensure that the carrier 30 does become disassembled during the installation or assembly process. At least part of the seal member 32 is enveloped by the carrier 30. More specifically, the axial flange 33 is radially outward of the open portion 40 and the aft face 54 of first flange 44 of the carrier 30 is engaged with the first end 36 of the seal member 32. The second end 38 of the seal member 32 is engaged with a forward face 56 of the second portion 26 of the nozzle 18. The configuration of the seal assembly 28 provides for multiple points where a seal is provided, thereby preventing leakage of air in at least the radial direction. More specifically, in the embodiment shown in FIG. 2, a seal may be provided between the contact portion 46 of the liner 12 and the forward face 42 of the first flange 44, between the first end 36 of the seal member 32 and the aft face 54 of the first flange 44, and between the second end 38 of the seal member 32 and the forward face 56 of the second portion 26 of the nozzle 18. These seals thereby prevent the disadvantageous leakage of air in the radial direction. Furthermore, in the embodiment shown in FIGS. 2 and 4, the carrier 30 further includes a third flange 58 configured to act as a thermal barrier between the space 27 and at least a portion of the seal member 32.

The invention is particularly advantageous for preventing leakage in the radial direction between a liner 12 of a combustor and a first stage nozzle 18. For this reason, the system and method is described herein with a frame of reference to such components of a turbine. Moreover, terms such as radial, circumferential and axial are used to describe the system in the chosen frame of reference. The invention, however, is not limited to the chosen frame of reference and descriptive terms, and may be used on turbine components other than the liner 12 of a combustor and a first stage nozzle 18, and in other orientations in a turbine. Those of ordinary skill in the art will recognize that descriptive terms used herein may not directly apply when there is a change in the frame of reference. Nevertheless, the disclosure is intended to be independent of location and orientation within a turbine and the relative terms used to describe the system and method are to merely provide an adequate description of the disclosure.

Figure 3:
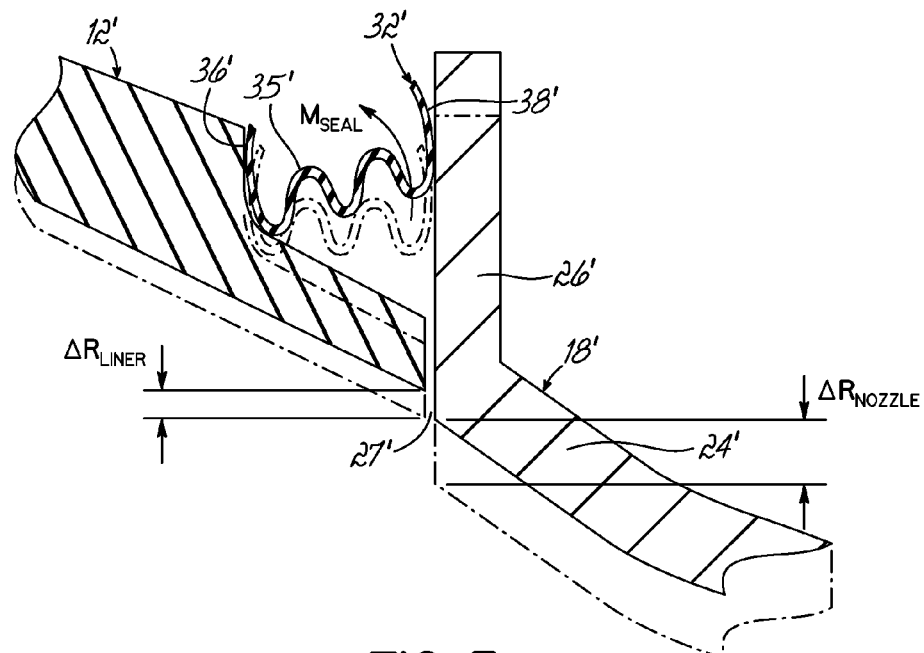
FIG. 3 shows a side cross-sectional view of a turbine of the prior art as it experiences a change in ambient temperature.

With reference to FIG. 2, the liner 12 comprises a first material and the nozzle 18 comprises a second material. Preferably, the liner 12 comprises a ceramic matrix composite (CMC) material and the nozzle 18 comprises a metal. Because CMC material may be prone to wear, a lubricious coating may be provided on the contact portion 46 of the liner 12 or the forward face 42 of first flange 44, or between the two components. Due to the differing coefficients of thermal expansion between these two materials, the liner 12 and the nozzle 18 may expand at different rates and different amounts when subjected to an ambient temperature change, such as when hot, combusted gas travels from the combustor to the first stage nozzle 18. For example, as shown in FIG. 3, the liner 12' may expand a distance $\Delta R_{LINER}$ and the nozzle 18' may expand a distance $\Delta R_{NOZZLE}$. Issues may arise due to disparate thermal expansion between the liner 12' and the nozzle 18', and more specifically, issues relative to sealing the space therebetween, as discussed in further detail below.

A prior art turbine is shown in FIG. 3 with a seal member 32' provided between the liner 12' and the nozzle 18'. As the nozzle 18' expands a greater amount than the liner 12', the second end 38' of the seal member 32' moves radially relative to the first end 36'. Seal members 32' with convolutions 35' oriented in the axial direction generally cannot withstand large relative radial movement between axially spaced portions of the seal member 32'. This relative radial movement between the first and second ends 36', 38' of the seal member 32' may be referred to as seal roll. Seal roll is disadvantageous because it may cause a moment in the circumferential direction, thereby essentially twisting the seal member 32' in the circumferential direction. This moment $M_{SEAL}$ may result in the seal member 32' failing by becoming displaced and perhaps overturning within the space 27', or by tearing or otherwise breaking.

The seal assembly as described herein substantially prevents seal roll, thereby potentially preventing failure of the seal member, and maintaining a seal at the space between the liner 12 and the nozzle 18. The carrier 30 in each embodiment may comprise a material having the same or substantially similar coefficient of thermal expansion as the nozzle 18. For example, the carrier 30 may be the same material as the nozzle 18, such as metal, while the liner 12 comprises a different material, such as a ceramic, composite, or CMC. In an alternative embodiment, however, the carrier 30 may comprise a material having a same or substantially similar coefficient of thermal expansion as the liner 12. The amount of thermal expansion can be calculated by $\Delta L = L*\alpha*\Delta T$, where L is the length of the object in question, $\alpha$ is the coefficient of thermal expansion, and $\Delta T$ is the change in temperature. In one embodiment, the carrier 30 may comprise a material having a same or substantially similar coefficient of thermal expansion as the nozzle 18 such that the difference between $\Delta R_{LINER}$ and $\Delta R_{NOZZLE}$ is less than or equal to 0.030" (0.762 mm). Therefore, because thermal expansion is dependent upon at least three variables, including the coefficient of thermal expansion, the difference between $\Delta R_{LINER}$ and $\Delta R_{NOZZLE}$ depends on more than just the coefficient of thermal expansion. Therefore, persons skilled in the art will recognize that providing such a difference between $\Delta R_{LINER}$ and $\Delta R_{NOZZLE}$ may be accomplished by altering the other variables on which the thermal expansion is dependent. However, it also may be appreciated by persons skilled in the art that a difference less than or equal to 0.030" (0.762 mm) between $\Delta R_{LINER}$ and $\Delta R_{NOZZLE}$ is limited to one embodiment described herein and is not meant to limit other embodiments where the relative movement may be more or less. Moreover, a different amount of relative movement may be prescribed in an embodiment where the first and second turbine components are something other than a nozzle and a liner of a combustor. Moreover, the turbine components referred to herein are not limited to solely gas turbines engines used in aircrafts, but may also refer to turbine components in gas turbine engines for other applications, such as other types of machinery that utilize gas turbine engines.

As the temperature of the ambient environment of the turbine increases, the nozzle 18 expands a distance $\Delta R_{NOZZLE}$ and the carrier expands a substantially similar or same amount $\Delta R_{CARRIER}$, while the liner 12 expands a different, and preferably lesser, amount $\Delta R_{LINER}$. Because the first end 36 of the seal member 32 is coupled with the aft face 54 of the first flange 44 of the carrier 30, and the second end 38 of the seal member 32 is coupled with the forward face 56 of the second portion 26 of the nozzle 18, and the first and second ends 36, 38 may move a substantially same or similar amount such that relative movement between the first and second ends 36, 38 is minimal. This prevention of relative movement between the first and second ends 36, 38 of the seal member 32 thereby prevents the potential problems of seal roll described above.

The embodiment shown in FIG. 1 is one embodiment configured to maintain the seal in the space between the liner 12 and the nozzle 18 as described herein. Alternatively, the seal assembly 32 may be configured such that the carrier 30 substantially follows or mimics the expansion of the liner 12 and prevents relative radial movement between the first and the second ends 36, 38 of the seal member 32.

Alternative embodiments of a turbine are shown in FIGS. 5, 6 & 7 and FIGS. 8, 9 & 10. In each embodiment, the turbine 110 includes a combustor (not shown) having a liner 112. The liner 112 is situated at an angle relative to a center axis of the turbine 110. The liner 112 includes an outer radial side 114 and an inner radial side 116. The inner radial side communicates with the channel 123 through which the combusted gases may flow into the first stage. The turbine 110 includes a nozzle 118 aft of the liner 112. The nozzle 118 includes an outer radial side 120 and an inner radial side 122. The nozzle 118 comprises a first portion 124 situated at an angle relative to the center axis of the turbine 110 and a second portion 126 extending radially outward from the first portion 124 of the nozzle 118. There is a space 127 between the liner 112 and the nozzle 118.

The turbine 110 further includes a seal assembly 128. The seal assembly 128 includes a carrier 130 and a seal member 132. The carrier 130 comprises a first member 134 and a second member 136. The first member 134 includes an axial flange 138 and a radial flange 140 extending in the radially inward direction from the axial flange 138. The second member 136 of the seal carrier 130 includes forward and aft radial flanges 142, 144 and an axial flange 146 between the forward and aft radial flanges 142, 144. The forward and aft radial flanges 142, 144 and the axial flange 146 of the second member 136 essentially envelop the second portion 126 of the nozzle 118. The forward radial flange 142 includes a second axial flange 147 extending in the axially forward position.

There is a seal member 132 in the space 127, a portion of which is engaged with the seal carrier 130. The seal member 132 (FIGS. 6 & 9, e.g.) includes a convoluted portion 148 including multiple folds or convolutions 150 such that it is a generally "W" shaped member. However, there may be more convolutions 150 than shown in FIGS. 6 and 9. The seal member 132 includes first and second ends 152, 154.

The first end 152 is forward of the convoluted portion 148 and the second end 154 is aft of the convoluted portion 148. A generally open portion 156 is disposed generally radially away from the convoluted portion 148 and between the first and second ends 152, 154.

The seal carrier 130 essentially envelops at least a portion of the seal member 132. More specifically, the seal carrier 130 is preferably situated at the space 127 such that a forward face 158 of the radial flange 140 of the first member 134 is engaged with a contact portion 160 of the liner 112. The seal member 132 and carrier 130 are positioned such that the axial flange 138 is radially outward of the open portion 156 and the aft face 162 of radial flange 140 of first member 134 is engaged with the first end 152 of the seal member 132. The second end 154 of the seal member 132 is engaged with a forward face 164 of the forward radial flange 142 of the second member 136. The configuration of the seal assembly 128 provides for multiple points where a seal is provided, thereby preventing leakage of air in at least the radial direction. More specifically, a seal is provided between the contact portion 160 of the liner 112 and the forward face 158 of the radial flange 140 of the first member 134, between the first end 152 of the seal member 132 and the aft face 162 of the radial flange 140 of the first member 134, and between the second end 154 of the seal member 132 and the forward face 164 of the forward radial flange 142 of the second member 136, as well as between the aft face 165 of the forward radial flange 142 and the second portion 126 of the nozzle 118. These seals thereby prevent the disadvantageous leakage of air in the radial direction. The second axial flange 147 of the second member 136 is adapted to provide a thermal barrier for at least a portion of the seal member 132.

The carrier 130 in may comprise a material having the same or substantially similar coefficient of thermal expansion as the nozzle 118. For example, the carrier 130 may be the same material as the nozzle 118, such as metal, while the liner 112 comprises a different material, such as a ceramic, composite, or CMC. In an alternative embodiment, however, the carrier 130 may comprise a material having a same or substantially similar coefficient of thermal expansion as the liner 112.

As shown in FIGS. 5 & 7 and 6 & 10, the axial flange 138 of the first member 134 is provided with circumferentially spaced resilient portions 166 (FIG. 5), 166' (FIG. 8). In the embodiment as shown in FIGS. 4 and 7, each resilient portion 166 includes an axial elongate member 168 between a pair of axially oriented slots 170. The slots 170 may be provided in order to increase the amount of radial deflection of the elongate members 168. In the embodiment shown in FIGS. 8 & 10, the resilient portions 166' may include essentially circumferential elongate member 168' defined in part by slots 170'. More specifically, there are a plurality of slots 170', each slot 170' including an axial portion 172a, an elongate circumferential portion 172b, and a curved transition portion 172c therebetween.

The methods of assembling each embodiment are shown in FIGS. 11, 12, 13 and 14. FIGS. 11 and 12 show the assembly of the turbine 10 shown in FIGS. 1, 2 and 4. The seal carrier 30 is directed into engagement with the liner 12 such that the forward face 42 of the first flange 44 may be in contact with the contact portion 46 of the liner 12. Concurrently, or thereafter, the first end 36 of the seal member 32 is brought into engagement with the aft face 54 of the first flange 44 of the carrier 30. The nozzle 18 is then brought into engagement with the second end 38 of the seal member 32. More specifically, the forward face 56 of the second portion 26 of the nozzle 18 may be brought into engagement with the second end 38 of the seal member 32. To secure the nozzle 18 relative to the combustor and the liner 12, as well as to secure the seal assembly 28, the axial flange 33 is bent, thereby forming the second flange 50. Once assembled, the turbine 10 is configured as shown in FIGS. 2 and 4. Assembly may be accomplished in several manners other than that disclosed above. There are two additional ways this device may be assembled. First, the seal member 32 may be engaged or assembled into the carrier 30. Next, the nozzle 18 may be assembled such that it is in engagement with the seal member 32. The axial flange 33 may then be bent down, thereby forming the second flange. The second flange is then used to fix the carrier 30 and seal member 32 relative to the nozzle 18. The nozzle 18, carrier 30 and seal member may then be engaged with the liner 12. In yet another alternative method of assembly, the second flange 50 is pre-bent in the configuration shown in FIGS. 2 and 4. The seal member 32 may then be assembled or engaged with the carrier 30. Where the nozzle portion is segmented (not shown), each nozzle segment may be installed individually by aligning the nozzle to an area without second flange 50, then clocking (rotating the nozzle 18 relative to the center axis) the nozzle 18 such that aft face 51 of the second portion 26 aligns with forward face 48 of second flange 50. Preferably, the clocking may takes place when installing the last segment (not shown) of the nozzle 18.

FIGS. 13 and 14 show the assembly of the embodiments as shown in FIGS. 6 and 9, respectively. The first member 134 of seal carrier 130 is directed into engagement with the liner 112 such that the forward face 158 of the radial flange 140 may be in contact with the contact portion 160 of the liner 112. Concurrently, or thereafter, the first end 152 of the seal member 132 is brought into engagement with the aft face 162 of the radial flange 140 of the carrier 130. The second member 136 of the carrier 130 is directed into engagement with the nozzle 118 such that the forward and aft radial flanges 142, 144 and the axial flange 146 of the second member 136 essentially envelop the second portion 126 of the nozzle 118. Thereafter, the second member 136 and nozzle 118, as assembled together, are directed in the axial direction, as shown by arrows 176, as the resilient portions 166, 166', and more specifically the elongate members 168, 168' are flexed in the radial direction, as indicated by arrows 178. The radial deflection of the elongate members 168, 168' allows for the second member 136 to be directed into engagement with the second end 154 of the seal member 132. More specifically, the second end 154 of the seal member 132 is engaged with the forward face 164 of the forward radial flange 142 of the second member 136. As shown in FIGS. 7 and 10, the elongate members 168, 168' each include hooked portions 174, 174', respectively. The hooked portions 174, 174' may be configured to resist the axial movement of the nozzle 118 by engaging with the second member 136 as the nozzle 118 and the second member 136 may move axially in the aft direction. An alternate method of assembly includes engaging the seal member 132 to the carrier 134, so that forward face 152 of seal member 132 is in contact with aft face 162 of carrier 134. Then, second member 136 may be engaged with the assembly such that forward face 164 of second member 136 is in contact with aft seal face 154. Nozzle 118 can be engaged, prior to, during or after engagement of second member 136. Nozzle 118 shall be engaged such that radial portion 126 is enveloped by second member 136 between radial flanges 142 and 144.

The seal assembly 128 as described herein is not limited to sealing a space 127 between a combustion liner 112 and a first stage nozzle 118. Rather, the seal assembly 128 as described herein may be configured to seal between first and second turbine components. The seal assembly may be configured to provide a seal where providing a seal is desired, preferably in a radial direction. Moreover, the turbine components referred to herein are not limited to solely gas turbines engines used in aircrafts, but may also refer to turbine components in gas turbine engines for other applications, such as other types of machinery that utilize gas turbine engines.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with the preferred methods of practicing the present invention as currently known. However, the invention itself should only be defined by the appended claims.

What is claimed is:

1. A turbine, comprising:
    a first turbine component being of a first material having a first coefficient of thermal expansion;
    a second turbine component being of a second material having a second coefficient of thermal expansion, said second turbine component adjacent said first turbine component;
    a space between said first and second turbine components;
    a seal assembly sealing said space, wherein at least a portion of said seal assembly has a coefficient of thermal expansion substantially similar to at least one of said first or second turbine components to thereby maintain a seal in said space during thermal expansion or contraction of said first and second turbine components;
    wherein said first turbine component is a liner of a combustor; and said second turbine component is a first stage nozzle;
    wherein said seal assembly further comprises a seal member and a seal carrier enveloping at least a portion of said seal member such that said seal member is isolated from contact with at least one of said liner or said nozzle; and
    wherein said seal carrier further comprises a first member between said liner and a first end of said seal member and a second member between said nozzle and a second end of said seal member.

2. The turbine of claim 1, wherein:
    a first portion of said seal assembly is engaged with said liner; and
    a second portion of said seal assembly is engaged with said nozzle.

3. The turbine of claim 1, further comprising:
    a barrier adapted to provide thermal insulation for at least a portion of said seal member.

4. The turbine of claim 1, wherein said seal member includes a convoluted portion.

5. The turbine of claim 1, wherein:
said seal member is positioned such that a first end of said seal member couples with said seal carrier and a second end of said seal member couples with one of said nozzle or said liner.

6. The turbine of claim 1, wherein said seal carrier has a coefficient of thermal expansion substantially similar to at least one of said first or second turbine components to thereby maintain a seal in said space during thermal expansion or contraction of said first and second turbine components.

7. The turbine of claim 1, wherein:
said first member includes a first flange between said liner and said first end of said seal and a second flange extending axially from said first member; and
said second member envelops a portion of said nozzle.

8. The turbine of claim 1, wherein:
said first member further comprises a resilient portion adapted to flex in a radial direction and provide space at least the nozzle to be positioned adjacent the liner.

9. A method of preventing leakage in a turbine, comprising:
situating a seal assembly in a space between first and second turbine components wherein the first turbine component comprises a liner of a combustor and the second turbine component comprises a first stage nozzle, engaging a first portion of the seal assembly with the liner and engaging a second portion of the seal assembly with the nozzle, thereby sealing the space, wherein the first and second turbine components are of first and second materials having first and second coefficients of thermal expansion, respectively, and wherein a portion of the seal assembly has a coefficient of thermal expansion substantially similar to at least one of the first or second turbine components, wherein the seal assembly further comprises a seal member and a seal carrier;
enveloping at least a portion of the seal member such that the seal member is isolated from contact with at least one of the liner or the nozzle;
coupling the seal member with one of the liner or the nozzle;
coupling one end of the seal carrier with the liner and the other end of the seal carrier with the nozzle; and
maintaining a seal in the space during thermal expansion or contraction of said first and second turbine components.

10. The method of claim 9, wherein the seal carrier has a coefficient of thermal expansion substantially similar to at least one of said first or second turbine components to thereby maintain a seal in said space during thermal expansion or contraction of said first and second turbine components.

11. The method of claim 10, wherein the seal carrier essentially mimics a thermal expansion of at least one of the liner or nozzle, thereby preventing a relative movement between the first and second ends of the seal member.

12. The method of claim 9, further comprising:
providing a barrier to thermally insulate at least a portion of the seal member.

13. The method of claim 9, wherein the seal carrier further comprises a first member and a second member and the method further comprises:
positioning a portion of the first member between the liner and a first end of the seal member; and
positioning a portion of the second member between the nozzle and a second end of the seal member.

* * * * *